(12) United States Patent
Kim et al.

(10) Patent No.: US 10,196,065 B2
(45) Date of Patent: Feb. 5, 2019

(54) VEHICLE CONTROL SYSTEM

(71) Applicant: TOYOTA JIDOSHA KABUSHIKI KAISHA, Toyota-shi, Aichi-ken (JP)

(72) Inventors: Jonggap Kim, Hadano (JP); Hideo Watanabe, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 103 days.

(21) Appl. No.: 15/296,585

(22) Filed: Oct. 18, 2016

(65) Prior Publication Data

US 2017/0113690 A1 Apr. 27, 2017

(30) Foreign Application Priority Data

Oct. 21, 2015 (JP) ................... 2015-207116

(51) Int. Cl.
*B60W 10/06* (2006.01)
*B60W 30/182* (2012.01)
*B60W 10/11* (2012.01)
*F02D 41/14* (2006.01)
*F02D 41/02* (2006.01)
*F02D 37/02* (2006.01)

(52) U.S. Cl.
CPC .......... *B60W 30/182* (2013.01); *B60W 10/06* (2013.01); *B60W 10/11* (2013.01); *F02D 37/02* (2013.01); *F02D 41/023* (2013.01); *F02D 41/1454* (2013.01); *F02D 41/1475* (2013.01); *B60W 2510/0619* (2013.01); *B60W 2510/0638* (2013.01); *B60W 2510/0657* (2013.01); *B60W 2710/0622* (2013.01); *B60W 2710/1005* (2013.01); *F02D 2200/101* (2013.01); *F02D 2200/1002* (2013.01); *F02D 2250/21* (2013.01)

(58) Field of Classification Search
CPC ...................................................... B60W 10/06
See application file for complete search history.

(56) References Cited

FOREIGN PATENT DOCUMENTS

| JP | H05-104990 A | 4/1993 |
|---|---|---|
| JP | H07/119512 A | 9/1995 |
| JP | H11-170892 A | 6/1999 |
| JP | 2002-349688 A | 4/2002 |
| JP | 2003-214216 A | 7/2003 |

*Primary Examiner* — Derek D Knight
(74) *Attorney, Agent, or Firm* — Hunton Andrews Kurth LLP

(57) ABSTRACT

A vehicle control system is provided to promptly execute an ignition retard of the engine during shifting a gear stage in such a manner as to prevent an engine misfire, while switching air/fuel ratio from lean-burn ratio to stoichiometric ratio. An air/fuel ratio is switched between a stoichiometric ratio and a lean-burn ratio based on an operating point of an engine determined based on an engine speed and an engine torque. If a shifting operation of gear stage and a switching operation of the air/fuel ratio from the lean-burn ratio to the stoichiometric ratio are expected to be executed simultaneously, a controller delays the shifting operation of gear stage until completion of the switching operation of the air/fuel ratio.

3 Claims, 9 Drawing Sheets

Fig. 5

| Pattern | Shift Mode | Order of Command | Stoichiometric Ratio to Lean-Burn Ratio |
|---|---|---|---|
| 1 | Auto | Gear Shift Command is First | In the order of Signal Transmission |
| 2 | | Air/fuel Ratio Switching Command is First | Ditto |
| 3 | Manual | Gear Shift Command is First | Shift Gear Stage First, Then Switch Air Fuel Ratio |
| 4 | | Air/fuel Ratio Switching Command is First | Shift Gear Stage During Switching Air/fuel Ratio |

Fig. 6

| Pattern | Shift Mode | Order of Command | Lean-Burn Ratio to Stoichiometric Ratio |
|---|---|---|---|
| 5 | Auto | Gear Shift Command is First | Switch Air/fuel Ratio First, Then Shift Gear Stage |
| 6 | | Air/fuel Ratio Switching Command is First | Ditto |
| 7 | Manual | Gear Shift Command is First | Ditto |
| 8 | | Air/fuel Ratio Switching Command is First | Ditto |

VEHICLE CONTROL SYSTEM

CROSS REFERENCE TO RELATED APPLICATIONS

The present invention claims the benefit of priority to Japanese Patent Application No. 2015-207116 filed on Oct. 21, 2015 with the Japanese Patent Office, the entire contents of which are incorporated herein by reference in its entirety.

BACKGROUND

Field of the Disclosure

Embodiments of the present application relate to the art of a vehicle control system configured to control an internal combustion engine that is operated with different air/fuel ratios and an automatic transmission that changes an input speed from the engine.

Discussion of the Related Art

In the conventional lean-burn engines, air/fuel ratio can be altered between stoichiometric ratio in which the engine is run at the stoichiometric point and lean-burn ratio in which a ratio of fuel to air is decreased to save the fuel.

Whereas, in the automatic transmission, a shift shock may be caused by pulsation of an input torque from the engine. In the conventional vehicle, in order to suppress such shift shock by reducing an input torque to the transmission, an ignition timing of the engine is retarded from the so-called MBT (Minimum advance for the Best Torque) timing at which the maximum cylinder pressure will occur.

JP-A-11-170892 describes a control device for reducing a shift shock. According to the teachings of JP-A-11-170892, the control device is configured to inhibit a switching control of air/fuel ratio between the lean-burn ratio and the stoichiometric ratio during a shifting operation of gear stage of a transmission, and to inhibit the shifting operation of the transmission during execution of the switching control of air/fuel ratio.

JP-A-05-104990 describes a shock reducing device for powertrain configured to reduce shock of the powertrain by carrying out a switching control of engine output characteristic simultaneously with a shift control of gear stage of a transmission.

JP-A-2003-214216 also describes a control device and a control method of the lean-burn engine. According to the teachings of JP-A-2003-214216, a switching demand of air/fuel ratio from the stoichiometric ratio to the lean-burn ratio is limited if an engine load is fluctuated by an accelerating operation, a clutch operation, or a speed change operation.

However, a shifting operation of the transmission may be executed before switching the air/fuel ratio if required before the switching operation of air/fuel ratio is required. In this case, if the engine is operated in the lean-burn mode in which an ignition timing of the engine is retarded almost to the maximum retarded timing, an engine misfire may be caused by further retarding the ignition timing. Consequently, shift shock may be caused during shifting operation of the transmission.

In order to avoid such misfire of the engine, it is required to develop a technique for promptly carrying out a torque-down control such as the ignition retard during shifting operation of the transmission, while switching air/fuel ratio from the lean-burn ratio to the stoichiometric ratio.

SUMMARY

Aspects of embodiments of the present application have been conceived noting the foregoing technical problems, and it is therefore an object of the present application is to provide a vehicle control system configured to promptly execute an ignition retard of the engine during execution of a shifting operation of the transmission in such a manner as to prevent an engine misfire, while switching air/fuel ratio from the lean-burn ratio to the stoichiometric ratio.

The present invention relates to a vehicle control system that is applied to a vehicle comprising an engine that is operated by burning an air/fuel mixture supplied to cylinders, and a transmission that transmits a drive torque delivered from the engine while changing the drive torque by shifting a gear stage among a plurality of gear stages of different gear ratios. In order to achieve the above-explained objective, according to the embodiment of the present application, the vehicle control system is provided with a controller for controlling the engine and the transmission. An operating mode of the engine may be switched between a stoichiometric mode in which an air/fuel ratio is set to a stoichiometric ratio, and a lean-burn mode in which the air/fuel ratio is set to a lean-burn ratio based on an operating point of the engine determined based on a speed and a torque of the engine. Specifically, the controller is configured to delay a shifting operation of gear stage of the transmission until completion of a switching operation of the air/fuel ratio, in a case of switching the air/fuel ratio from the lean-burn ratio to the stoichiometric ratio, and the shifting operation of gear stage and the switching operation of the air/fuel ratio are expected to be executed simultaneously.

In a non-limiting embodiment, the controller may be configured to prevent a simultaneous execution of the switching operation of the air/fuel ratio and the shifting operation of the gear stage by executing the switching operation of the air/fuel ratio and the shifting operation of the gear stage in an order of transmission of command signals for executing those operations.

In a non-limiting embodiment, the gear stage of the transmission may be shifted manually. In addition, the controller may be configured to execute the shifting operation of the gear stage in response to a manual shifting operation executed by a driver during execution of the switching operation of the air/fuel ratio from the stoichiometric ratio to the lean-burn ratio, and to delay the switching operation of the air/fuel ratio until completion of a manual shifting operation of the gear stage, if a condition to switch the air/fuel ratio from the stoichiometric ratio to the lean-burn ratio is satisfied during execution of the manual shifting operation of the gear stage.

Thus, according to the embodiment of the present application, the delay a shifting operation of gear stage of the transmission is delayed until completion of the switching operation of the air/fuel ratio from the lean-burn ratio to the stoichiometric ratio, if the shifting operation of gear stage and the switching operation of the air/fuel ratio are expected to be executed simultaneously. According to the embodiment, therefore, the air/fuel ratio can be switched promptly from the lean-burn ratio to the stoichiometric ratio. In addition, since the engine can be combusted stably in the stoichiometric mode, an ignition timing of the engine can be retarded in the stoichiometric mode without causing an engine misfire.

In a case of switching the air/fuel ratio from the stoichiometric ratio to the lean-burn ratio, it takes longer time until the air/fuel ratio is completely changed to the lean-burn ratio in comparison with the other case. In this case, one of the switching operation of the air/fuel ratio and the shifting operation of the gear stage is delayed until completion of the other operation to avoid simultaneous execution of those operations. For this reason, torque change can be reduced during execution of the switching operation of the air/fuel ratio and the shifting operation of the gear stage.

In the case of switching the air/fuel ratio from the stoichiometric ratio to the lean-burn ratio, specifically, it takes some time to increase an air intake especially in the engine having a turbocharger. In this case, therefore, the manual shifting operation is executed preferentially in response to a manual shifting operation by the driver even during switching the air/fuel ratio from the stoichiometric ratio to the lean-burn ratio. By contrast, if the condition to switch the air/fuel ratio from the stoichiometric ratio to the lean-burn ratio is satisfied during execution of the manual shifting operation of the gear stage, the switching operation of the air/fuel ratio is delayed until completion of the manual shifting operation of the gear stage. That is, the manual shifting operation is executed in the stoichiometric mode so that the ignition retard of the engine can be executed. In addition, since the air/fuel ratio is switched to the lean-burn ratio after completion of the manual shifting operation, an occurrence of engine misfire can be avoided.

BRIEF DESCRIPTION OF THE DRAWINGS

Features, aspects, and advantages of exemplary embodiments of the present invention will become better understood with reference to the following description and accompanying drawings, which should not limit the invention in any way.

FIG. 5 is a table showing patterns of transmission order of command signals and execution order of the switching operation from the stoichiometric ratio to the lean-burn ratio and the shifting operation of the gear stage;

FIG. 6 is a table showing patterns of transmission order of command signals and execution order of the switching operation from the lean-burn ratio to the stoichiometric ratio and the shifting operation of the gear stage;

DETAILED DESCRIPTION OF THE PREFERRED EMBODIMENT(S)

Figure 1:
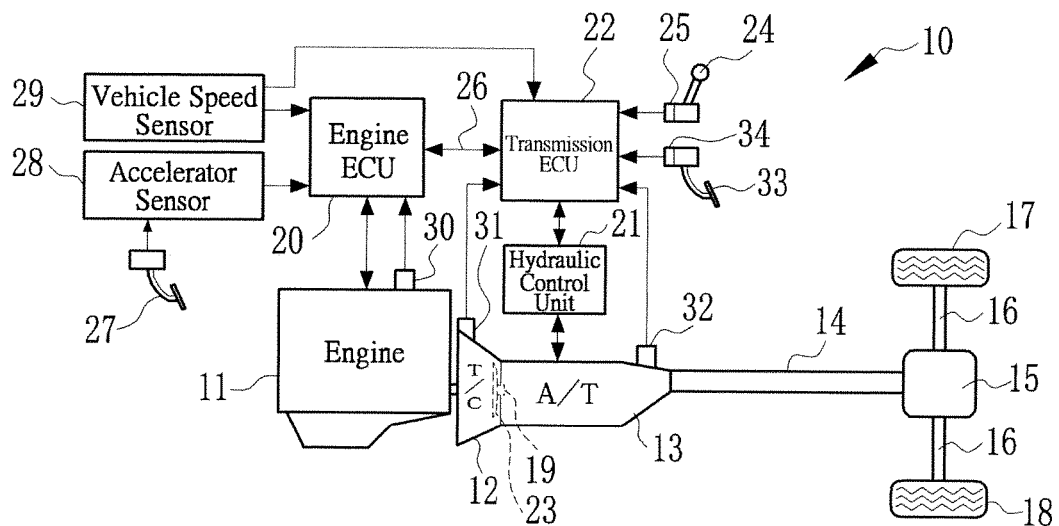
FIG. 1 is a schematic illustration showing one example of a structure of the vehicle to which the control system according to the embodiment is applied.

Preferred embodiments of the present application will now be explained with reference to the accompanying drawings. Turning now to FIG. 1, there is shown one example of structure of a vehicle 10 to which the control system according to the embodiment is applied. The vehicle 10 comprises a lean-burn engine (as will be simply called the "engine") 11, a torque converter (referred to as "T/C" in FIG. 1) 12, an automatic transmission (as will be simply called the "transmission", and referred to as "A/T" in FIG. 1) 13, an output shaft 14, a differential 15, a driveshaft 16, a pair of drive wheels 17 and 18 and so on. The engine 11 generates drive torque by burning an air/fuel mixture supplied to cylinders. The drive torque generated by the engine 11 is delivered to an input shaft 19 of the transmission 13 via the torque converter 12, and further distributed to the drive wheels 17 and 18 through a differential gear unit 15 and a driveshaft 16.

An air/fuel ratio of air/fuel mixture to be supplied to the engine 11 may be switched by an engine ECU (i.e., an electronic control unit) 20 between stoichiometric ratio in which fuel is combusted stoichiometrically, and lean-burn ratio in which a ratio of the fuel to air is decreased. The stoichiometric ratio is selected within a mid-low engine load range, and the lean-burn ratio is selected within a high engine load or when the engine 11 is at an idle speed. Optionally, a richer air/fuel ratio than the stoichiometric ratio may also be selected when starting the engine 10 or when accelerating the vehicle.

Specifically, the transmission 13 is a planetary gear unit, and the input shaft 19 thereof is rotated by a turbine runner 23 of the torque converter 12. A gear stage of the transmission 13 is switched by altering engagement states of frictional engagement elements (not shown) such as a clutch, a brake, a one-way clutch etc. by a hydraulic control unit 21. To this end, the hydraulic control unit 21 is configured to alter an engagement pressure applied to each of the frictional engagement element individually in conjunction with a transmission ECU 22. That is, a torque transmitting capacity of each of the frictional engagement elements may be altered individually.

Specifically, the frictional engagement elements include both single plate and multiple plate clutches and brakes actuated by a hydraulic actuator, and a belt type brake. A gear stage of the transmission 13 is shifted to a desired stage by a clutch-to-clutch shifting. To this end, the transmission ECU 22 transmits hydraulic commands to the hydraulic control unit 21 to determine a torque transmitting capacity of the frictional engagement element currently in engagement to establish the current gear stage (that is, a torque transmitting capacity of the frictional engagement element to be disengaged), and to determine a torque transmitting capacity of the frictional engagement element to be engaged to shift the gear stage by the clutch-to-clutch shifting (that is, a torque transmitting capacity of the frictional engagement element to be engaged).

A shift mode of the transmission 13 may be switched between an automatic mode and a manual mode by operating a shift lever 24 connected to a shift position sensor 25 that detects a position of the shift lever 24. Specifically, the automatic mode is selected by moving the shift lever 24 to a drive position in which the gear stage of the transmission 13 is shifted automatically, and the manual mode is selected by moving the shift lever 24 to a manual position in which the gear stage of the transmission 13 is shifted manually. In the manual mode, the gear stage is shifted manually by operating the shift lever 24 in the manual position thereby transmitting a shift command to achieve a selected gear stage from the shift position sensor 25 to the transmission ECU 22. Consequently, the transmission ECU 22 controls the transmission 13 in such a manner as to achieve the selected gear stage.

Optionally, a switch arranged on a steering wheel, or a puddle shift device may also be used instead of the shift lever 24. As described, an automatic transmission having a torque converter is used as the transmission 13. However, an automated manual transmission (i.e., an AMT) having a structure of conventional manual transmission but controlled automatically, and a dual-clutch transmission (i.e., a DCT) having two separate clutch for odd and even gear sets may also be used as the transmission 13.

The engine ECU 20 and the transmission ECU 22 are connected through a communication line 26 so that information can be exchanged therebetween. Optionally, the engine ECU 20 and the transmission ECU 22 may also be formed into one unit.

An accelerator sensor 28 for detecting a depression of an accelerator pedal 27 is connected to the engine ECU 20, and a vehicle speed sensor 29 for detecting a vehicle speed is connected individually to the engine ECU 20 and the transmission ECU 22. In addition, an engine speed sensor 30 for detecting an engine speed is also connected to the engine ECU 20.

A turbine speed sensor 31 for detecting a speed of the turbine runner 23, and an output speed sensor 32 for detecting a speed of the output shaft 14 are connected to the transmission ECU 22. The above-mentioned vehicle speed sensor 29 may be omitted according to need. In this case, the output speed sensor 32 also detects a vehicle speed. In addition, a brake pedal sensor 34 for detecting a depression of a brake pedal is also connected to the transmission ECU 22. Here, those sensors may also be connected one of the ECUs 20 and 22 to be connected indirectly to the other ECU 20 or 22.

The transmission ECU 22 is configured to shift the gear stage of the transmission 13 based on a depression of the accelerator pedal and a vehicle speed, and the engine ECU 20 is configured to switch air/fuel ratio based on: a target engine torque calculated based on the depression of the accelerator pedal; and a vehicle speed and an actual engine speed.

In addition, a chain-driven or belt-driven continuously variable transmission (i.e., a CVT) may also be used as the transmission 13. In this case, specific speed ratios are selected to achieve desired number of gear stages.

Figure 2:
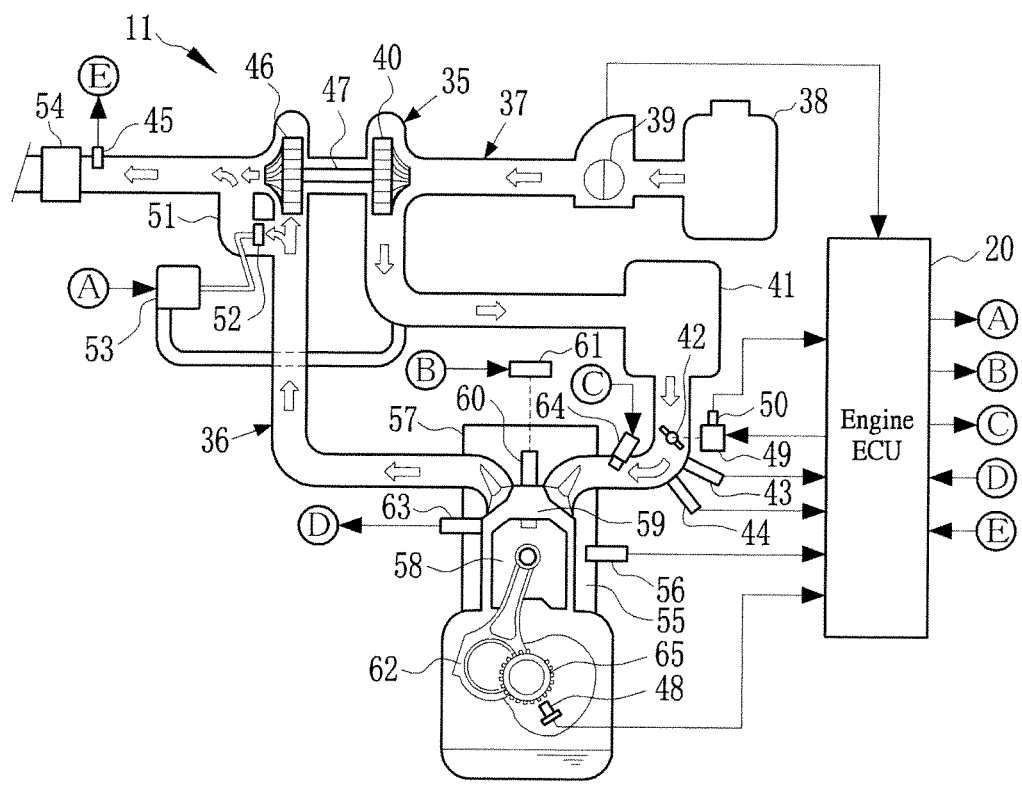
FIG. 2 is a schematic illustration showing one example of an internal combustion engine used in the vehicle shown in FIG. 1.

Turning to FIG. 2, there is shown an example of a structure of the engine 11 as a gasoline engine having a plurality of cylinders and an ignitor. As illustrated in FIG. 2, a turbocharger 35 is disposed between an exhaust pipe 36 and an intake pipe 37. The turbocharger 35 is rotated by at least a portion of exhaust gas to boost an intake manifold pressure. Here, it is to be noted that only one cylinder is illustrated for the sake of illustration.

An air cleaner 38 for filtering air, an airflow sensor 39 for detecting an air intake amount, and a compressor wheel 40 are arranged in the intake pipe 37. Whereas, an intercooler 41 for compulsory cooling the intake air heated by the turbocharger 35, and a throttle valve 42 for adjusting an air intake are arranged in the exhaust pipe 37.

In addition, an intake air temperature sensor 43 and an intake manifold pressure sensor 44 are arranged in the intake pipe 37. Specifically, the intake air temperature sensor 43 measures a temperature of the air after cooled by the intercooler 41 but before aspirated into the engine 11, and intake manifold pressure sensor 44 detects an internal pressure of an intake manifold (not shown), that is, a boost pressure (or intake pressure).

The turbocharger 35 comprises a turbine wheel 46, a compressor wheel 40, a connection shaft 47 and so on. Specifically, the turbine wheel 46 is arranged in the exhaust pipe 36 to be driven by the flow of exhaust gas of the engine 11. On the other hand, the compressor wheel 40 is arranged in the intake pipe 37 to be driven integrally with the turbine wheel 46 through the connection shaft 47 to compress the intake air.

The air compressed by the rotation of the compressor wheel 46 is delivered compulsory to the combustion chamber of each of the cylinder. However, if the exhaust gas delivered to the turbine wheel 46 is insufficient, the intake air is delivered to the combustion chamber of each of the cylinder without being compressed as it is in a naturally aspirated engine.

A throttle valve 42 is also arranged in the intake pipe 37 between the intercooler 41 and a combustion chamber 59 so that the air is delivered from the compressor wheel 40 to the throttle valve 42 while being cooled by the intercooler 41.

An opening degree of the throttle valve 42 is changed by operating a throttle actuator 49 by the engine ECU 20 in such a manner as to optimize an air intake in accordance with an operating condition of the engine 11. To this end, an opening degree of the throttle valve 42 can be controlled electrically independent of the accelerator pedal 27, and an opening degree of the throttle valve 42 can be detected by an opening sensor 50.

The exhaust pipe 36 includes a bypass pipe 51 detouring the turbine wheel 46, and a wastegate valve 52 is arranged in the bypass pipe 51 to adjust a flow rate of the exhaust gas flowing through the bypass pipe 51 thereby adjusting a boost pressure. To this end, an opening degree of the wastegate valve 52 is changed by operating an actuator 53 by the engine ECU 20.

The engine 10 is provided with a signal disc plate 65 having a scale such as protrusions or slits formed on an outer circumference to indicate a crank angle, and a crank angle sensor 48 that reads the scale of the signal disc plate 65 rotated integrally with a crankshaft (not shown) to detect a crank angle and a rotational speed of the crankshaft.

A water temperature sensor 56 is disposed on a cylinder block 55 of the engine 11 to measure a temperature of coolant. An upper opening of the cylinder block 55 is closed by a cylinder head 57 so that the combustion chamber 59 is created between the cylinder head 57 and a piston 58 held in the cylinder block 55. An ignition plug 60 is arranged in the combustion chamber 59, and an ignition timing of the ignition plug 60 may be adjusted by an ignitor 61.

In order to control an ignition timing of the ignitor 61 and to retard the ignition timing according to need, a detection signal of the crank angle sensor 48 is sent to the engine ECU 20 to inform a stage of engine cycle such as an induction, compression, ignition and emission.

Specifically, the engine ECU 20 adjust an ignition timing in such a manner that the air/fuel mixture in the combustion chamber is ignited when the crankshaft is advanced to an angle at which the maximum cylinder pressure will occur. To this end, a pressure sensor 63 for detecting an internal pressure in the cylinder is arranged in each of the cylinder.

In addition, an injector 64 for injecting fuel to an intake port of the cylinder is disposed between the throttle valve 42 and each of the cylinders, and fuel injection from the injector 64 is also controlled by the engine ECU 20.

The engine ECU 20 switches the air/fuel ratio from the stoichiometric ratio to the lean-burn ratio upon satisfaction of a predetermined condition. In other words, the engine ECU 20 switches an operating mode of the engine 11 from stoichiometric mode to lean-burn mode upon the satisfaction of a condition to switch the air/fuel ratio from the stoichiometric ratio to the lean-burn ratio. By contrast, the operating mode of the engine 11 is switched from the lean-burn mode to the stoichiometric mode when the above-mentioned condition is resolved.

Thus, the engine ECU 20 controls air/fuel ratio, fuel injection, opening degree of the throttle valve, ignition timing and so on based on the incident signals from the sensors.

An air/fuel ratio sensor 45 is also disposed in the exhaust pipe 36 on a downstream side of the turbine wheel 46 to measure a concentration of oxygen in the exhaust gas, and a catalyst 54 such as a three-way catalyst is disposed on a downstream side of the air/fuel ratio sensor 45 to purify the exhaust gas. A detection signal of the air/fuel ratio sensor 45 is also sent to the engine ECU 20, and the engine ECU 20 adjusts the fuel injection based on the detection signal from the air/fuel ratio sensor 45 by feedback method in such a manner that the air/fuel ratio of the exhaust gas is adjusted to a target ratio. That is, the engine ECU 20 detects a termination of the air/fuel ratio switching operation based on the detection signal from the air/fuel ratio sensor 45. Optionally, another air/fuel ratio sensor may be arranged on a downstream side of the catalyst 54 to detect a concentration of oxygen in the exhaust gas of the downstream side of the catalyst 54 thereby detecting a termination of the air/fuel ratio switching operation.

Although the port injection engine 11 in which the air/fuel mixture is injected to the cylinder is depicted in FIG. 2, a gasoline direct injection engine in which the fuel is injected directly to the cylinder separately from air may also be used as the engine 11. In addition, fuel includes gasoline, ethanol, ethanol/gasoline mixture, hydrogen, diesel and so on. Optionally, the turbocharger 35 may be omitted according to need.

Figure 3:
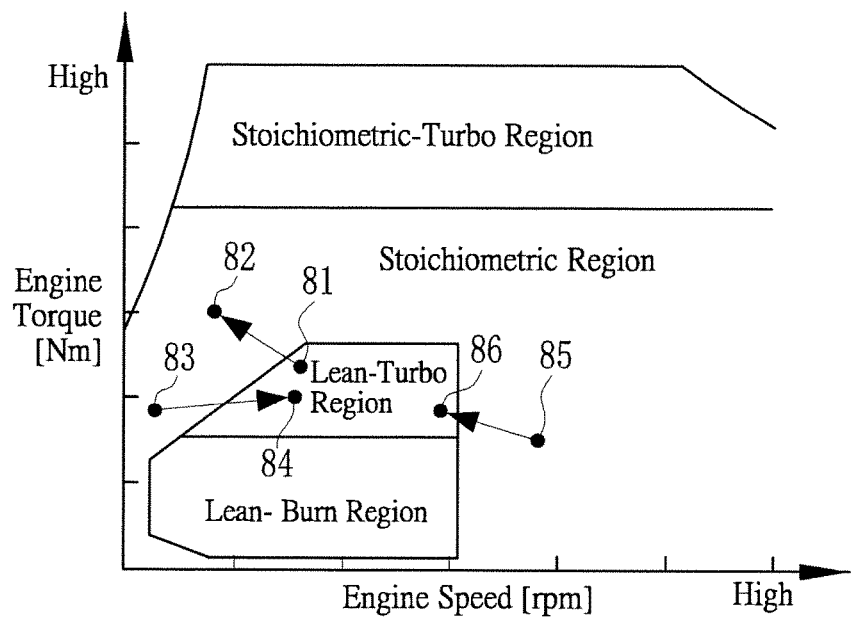
FIG. 3 is a map determining the operating mode of the engine.

Turning to FIG. 3, there is shown an example of a map determining an operating mode of the engine 11 based on an engine speed (Ne) and an engine torque (Nm), and the map is installed in a ROM (not shown) of the engine ECU 20. As described, the operating mode of the engine 11 includes the lean-burn mode and the stoichiometric mode, and an operating point of the engine 11 is determined based on a speed and a torque thereof. Specifically, the operating mode of the engine 11 is shifted to the lean-burn mode when the operating point of the engine 11 falls within a stoichiometric region, and to the lean-burn mode when the operating point of the engine 11 falls within a lean-burn region.

The engine ECU 20 comprises a calculator (not shown) for calculating a required engine torque based on e.g., a depression of the accelerator pedal 27. Specifically, the calculator calculates a current acceleration of the vehicle based on a current vehicle speed and an actual engine torque, and calculates a current road grade based on the calculated acceleration and the engine torque. The road gradient is calculated sequentially, and an expected acceleration is predicted based on the road gradient and the current depression of the accelerator pedal 27 to predict a future required engine torque. If a target operating point of the engine 11 determined based on the future required engine torque is shifted to another region, the air/fuel ratio is switched to the ratio corresponding to the region to which the operating point of the engine 11 is shifted.

As can be seen from FIG. 3, specifically, the operating mode of the engine 11 further includes a lean-turbo mode and a stoichiometric-turbo mode in which the compressed air is delivered compulsory to the combustion chamber.

Thus, the operating mode of the engine 11 is shifted to the lean-burn mode when the operating point of the engine 1 falls within the lean-burn range. Here, a product of the engine speed and the engine torque is an output of the engine 11. That is, the air/fuel ratio is switched to the lean-burn ratio depending on an engine load to generate power.

The engine ECU 20 further comprises a determiner for determining a satisfaction of a condition to operate the engine 11 in the lean-burn mode. For example, if the determiner determines a satisfaction of a condition to operate the engine 11 in the lean-burn mode during propulsion in the stoichiometric mode, the engine ECU 20 transmits a command to switch the operating mode of the engine 11 to the lean-burn mode. By contrast, if the determiner determines that the condition to operate the engine 11 in the lean-burn mode is no longer satisfied, the engine ECU 20 transmits a command to switch the operating mode of the engine 11 to the stoichiometric mode.

Specifically, when the engine load is low, a temperature of the catalyst 54 is not raised sufficiently and hence the condition to operate the engine 11 in the lean-burn mode is not satisfied. In this case, therefore, the operating point of the engine 11 is set within the stoichiometric region. In the stoichiometric mode and the lean-burn mode, the wastegate valve 52 is closed to stop delivery of air to the turbine wheel 46. That is, in the stoichiometric mode and the lean-burn mode, air intake is controlled only by the throttle valve 42.

For example, when the engine load is increased during operation in the lean-burn mode and hence the operating point of the engine 11 enters into the lean-turbo region, a required air intake cannot be ensured. In this situation, therefore, an opening degree of the wastegate valve 52 is opened slightly. When the engine load is further increased and hence the operating point enters into the stoichiometric region or the stoichiometric-turbo region, the condition to operate the engine 11 in the lean-burn mode is no longer satisfied and the engine 11 is operated in the stoichiometric mode or the stoichiometric-turbo mode.

Figure 4:
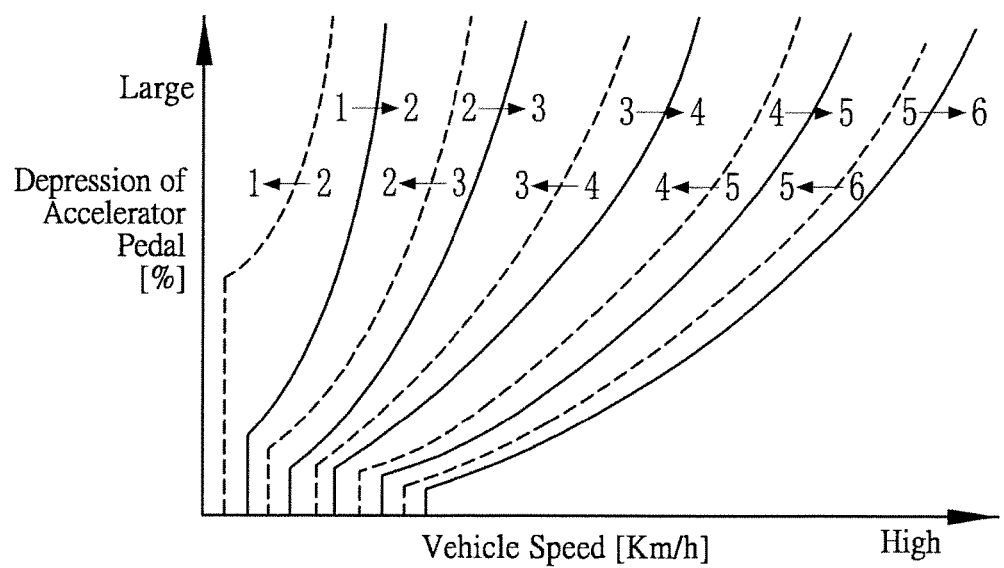
FIG. 4 is a shifting map determining the gear stage of the transmission.

Turning to FIG. 4, there is shown one example of a shift map for determining a gear stage of the transmission 13 based on a vehicle speed (Km/h) and a depression (%) of the accelerator pedal 27 (indicated as "accelerator opening" in FIG. 4) that is stored into a ROM of the transmission ECU 22. In the shift map shown in FIG. 4, each solid curve is an upshift line and each dashed line is a downshift line. Specifically, an upshift of the transmission 13 is executed when a shift point determined based on a vehicle speed and a depression of the accelerator pedal 27 is changed upwardly across the upshift line as indicated by a right-pointing arrow. Likewise, a downshift of the transmission 51 is executed when the shift point is changed downwardly across the downshift line as indicated by a left-pointing arrow.

Thus, the engine ECU 20 switches the air/fuel ratio based on the operating pint of the engine 11 determined based on the engine torque and the engine speed, and the transmission ECU 22 shifts a gear stage of the transmission 13 based on the shift point determined based on the vehicle speed and the accelerator opening. Those shifting operation of the gear stage and switching operation of the air/fuel ratio may be executed independently. However, if the air/fuel ratio is switched e.g., from the lean-burn ratio to the stoichiometric ratio simultaneously with shifting the gear stage, a misfire of the engine 10 may be caused by executing the ignition retard. In order to prevent such disadvantage, the ECUs 20 and 22 further comprises an inhibitor to prevent simultaneous execution of the switching operation of the air/fuel ratio and the shifting operation of the gear stage under a predetermined condition.

Specifically, the inhibitor changes an order of execution of the switching operation of the air/fuel ratio and the shifting operation of the gear stage depending on the shift mode of the transmission 13 and a sequential order of transmission of command signals for executing the switching operation of the air/fuel ratio and the shifting operation of the gear stage. FIG. 5 shows patterns of timings of transmission of command signals and the order of execution of the switching operation of the air/fuel ratio and the shifting operation of the gear stage, in a case of switching the air/fuel ratio from the stoichiometric ratio to the lean-burn ratio.

The pattern 1 is a case in which the shift mode is in the automatic mode, and the command signal for executing the shifting operation of the gear stage is transmitted before transmission of the command signal for executing the switching operation of the air/fuel ratio. In this case, for example, the command signal for executing the switching operation of the air/fuel ratio may be outputted when the operating point of the engine 11 is shifted from the stoichiometric region to the lean-burn region as a result of execution of the shifting operation of the gear stage. However, the command signal for executing the switching operation of the air/fuel ratio may also be outputted after transmission of the command signal for executing the shifting operation of the gear stage irrespective of the shifting operation of the gear stage. In the pattern 1, therefore, the shifting operation of the gear stage is executed first, and then the air/fuel ratio is switched from the stoichiometric ratio to the lean-burn ratio after completion of the shifting operation of the gear stage. For this reason, the simultaneous execution of the switching operation of the air/fuel ratio and the shifting operation of the gear stage can be prevented so that the torque-down control such as the ignition retard can be executed immediately. In addition, since the air/fuel ratio is switched to the lean-burn ratio after completion of the shifting of the gear stage, an engine misfire can be prevented even in the lean-burn mode in which an ignition timing of the engine 11 is retarded almost to the maximum retarded timing.

The pattern 2 is a case in which the shift mode is in the automatic mode, and the command signal for executing the switching operation of the air/fuel ratio is transmitted before transmission of the command signal for executing the shifting operation of gear stage. In this case, the air/fuel ratio is switched from the stoichiometric ratio to the lean-burn ratio first, and then the shifting operation of gear stage is executed after completion of the switching operation of the air/fuel ratio. In the pattern 2, therefore, the simultaneous execution of the switching operation of the air/fuel ratio and the shifting operation of the gear stage may also be prevented.

The pattern 3 is a case in which the shift mode is in the manual mode, and the command signal for executing the shifting operation of the gear stage is transmitted before transmission of the command for executing the switching operation of the air/fuel ratio. In this case, the gear stage is shifted manually first, and then the air/fuel ratio is switched from the stoichiometric ratio to the lean-burn ratio after completion of the manual shifting of the gear stage. Thus, in the pattern 3, the gear stage is shifted first in response to manual shifting operation by the driver so as to prevent the simultaneous execution of the switching operation of the air/fuel ratio and the shifting operation of the gear stage. For this reason, an engine misfire may also be prevented even if an ignition timing of the engine 11 is retarded.

The pattern 4 is a case in which the shift mode is in the manual mode, and the command signal for executing the switching operation of the air/fuel ratio is transmitted before transmission of the command signal for executing the shifting operation of the gear stage. In this case, the gear stage is allowed to be shifted in response to the manual shifting operation by the driver during switching the air/fuel ratio from the stoichiometric ratio to the lean-burn ratio.

Turing to FIG. 6, there are shown patterns of timings of transmission of the command signals and order of execution of the switching operation of the air/fuel ratio and the shifting operation of the gear stage, in a case of switching the air/fuel ratio from the lean-burn ratio to the stoichiometric ratio. As described, the command signal for executing the switching operation of the air/fuel ratio from the lean-burn ratio to the stoichiometric ratio may be outputted as a result of execution of the shifting operation of the gear stage. In this case, therefore, the timing of transmission of the command signal for executing the switching operation of the air/fuel ratio may be estimated on the basis of the target operating point of the engine 11. In addition, if the command signal for executing the switching operation of the air/fuel ratio is transmitted simultaneously with the transmission of the command signal for executing the shifting operation of the gear stage, the ECUs 20 and 22 determine that the command signal for executing the shifting operation of the gear stage is transmitted earlier than the command signal for executing the switching operation of the air/fuel ratio.

As can be seen from FIG. 6, in the case of switching the air/fuel ratio from the lean-burn ratio to the stoichiometric ratio, the switching operation of the air/fuel ratio is executed prior to the shifting operation of the gear stage irrespective of the shift mode and the order of transmission of the command signals. That is, in the case of thus switching the air/fuel ratio from the lean-burn ratio to the stoichiometric ratio, the inhibitor delays execution of the shifting operation of the gear stage until completion of the switching operation of the air/fuel ratio. In this case, therefore, the air/fuel ratio can be switched promptly from the lean-burn ratio to the stoichiometric ratio, and the ignition retard of the engine 11 can be carried out without causing a misfire.

Figure 7:
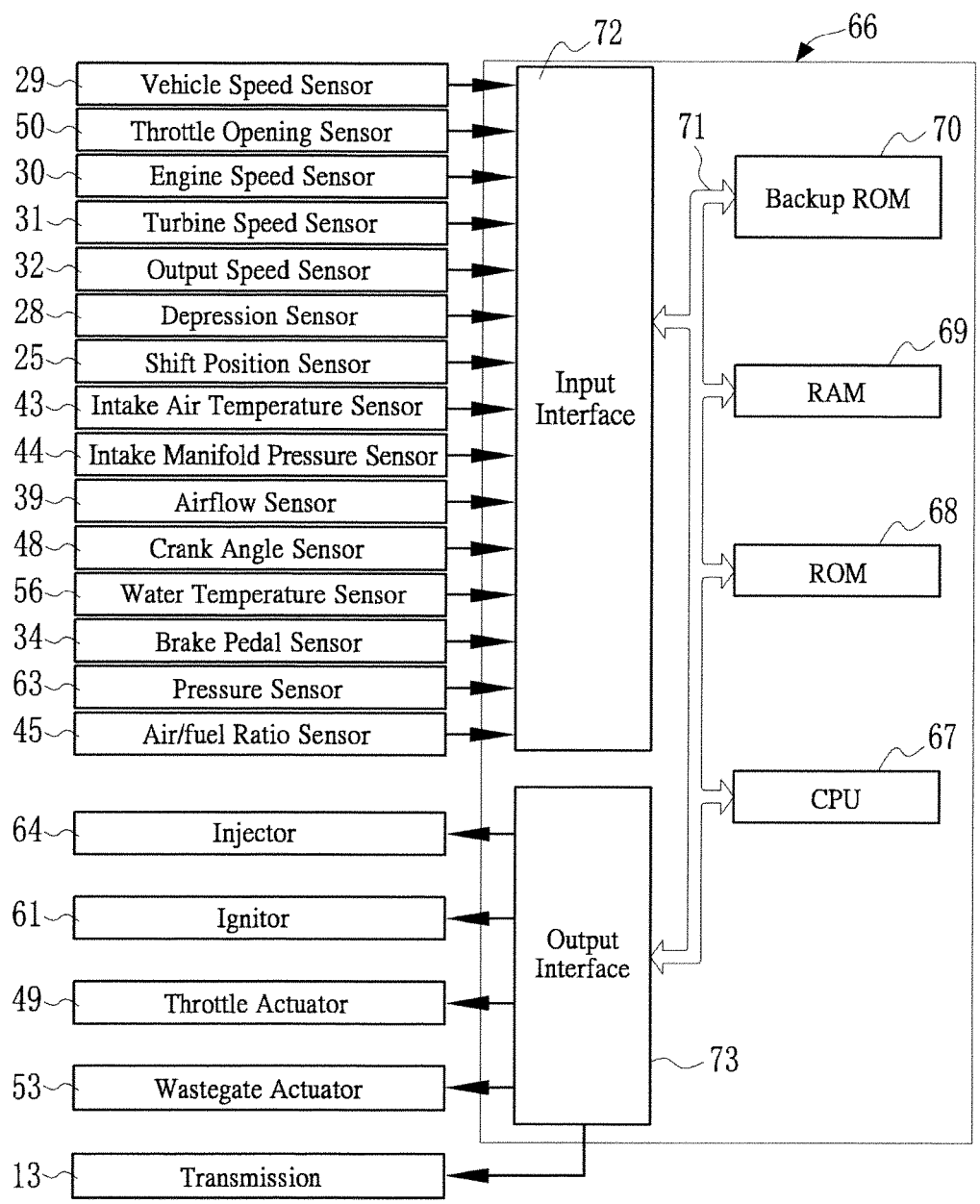
FIG. 7 is a schematic illustration showing an electronic control unit.

Turning to FIG. 7, there is shown a main ECU (to be simply called the "ECU" hereinafter) 66 including the engine ECU 20 and the transmission ECU 22. As shown in FIG. 7, the ECU 66 comprises a CPU (i.e., Central Processing Unit) 67, a ROM (i.e., Read Only Memory) 68, a RAM (i.e., Random Access Memory) 69, and a backup RAM 70. Specifically, the CPU 67 executes a calculation based on programs and maps stored into the ROM 68, and calculation results of the CPU 67 and the incident data from the sensors are temporarily stored into the RAM 69. The backup RAM 70 is a non-volatile RAM for storing data during cessation of engine operation. The CPU 67, the ROM 68, the RAM 69 and the backup RAM 7 are communicatably connected to each other and to an input interface 72 and an output interface 73 through a bus 71.

The input interface 72 is connected to the vehicle speed sensor 29, the throttle opening sensor 50, the engine speed sensor 30, the turbine speed sensor 31, the output speed sensor 32, the depression sensor 28, the shift position sensor 25, the intake air temperature sensor 43, the intake manifold pressure sensor 44, the airflow sensor 39, the crank angle sensor 48, the water temperature sensor 56, the brake pedal sensor 34, the pressure sensor 63, and the air/fuel ratio sensor 45.

Command signals of the output interface 73 are transmitted to the injector 64, the ignitor 61, the throttle actuator 49, and the actuator 53 for the wastegate valve 52.

Figure 8:
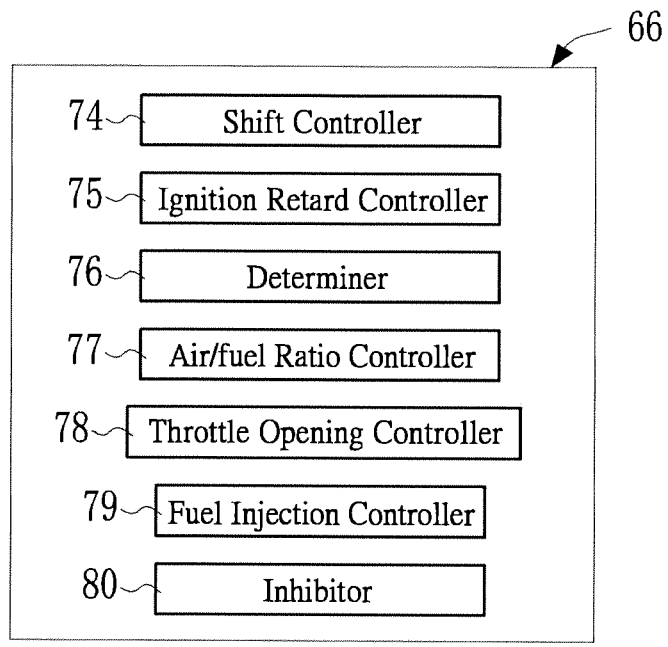
FIG. 8 is an explanatory chart showing functions of the electronic control unit.

FIG. 8 shows functions of the ECU 66 in detail. As described, in the ECU 11, the CPU 67 is operated based on the incident data and the programs stored into the ROM 68. Specifically, the ECU 66 comprises a shift controller 74, an ignition retard controller 75, a determiner 76, an air/fuel ratio controller 77, a throttle opening controller 78, a fuel injection controller 79, and an inhibitor 80.

Specifically, the shift controller 74 calculates a vehicle speed based on an incident signal from the output speed sensor 32, and an opening degree of the throttle valve 42 based on an incident signal from the throttle opening sensor 50. The shift controller 74 determines the target shift point based on the calculated vehicle speed and opening degree of the throttle valve 42 with reference to the shift map shown in FIG. 4, and determines to carry out a shifting operation to the target gear stage as necessary.

The ignition retard controller 75 carries out the ignition retard of the engine 11 during the shifting operation of the gear stage according to need. The determiner 76 determines a satisfaction of the condition of operating the engine 11 in the lean-burn mode, for example, based on a fact that the operating point of the engine 11 falls within the lean-burn region. The air/fuel ratio controller 77 executes the switching control of the air/fuel ratio based on a determination of the determiner 76. The throttle opening controller 78 controls the throttle actuator 49 and the actuator 53 of the wastegate valve 52 in such a manner as to optimize an air intake in accordance with an engine speed and a throttle opening. The inhibitor 80 inhibits simultaneous execution of the switching operation of the air/fuel ratio and the shifting operation of the gear stage.

Figure 9:
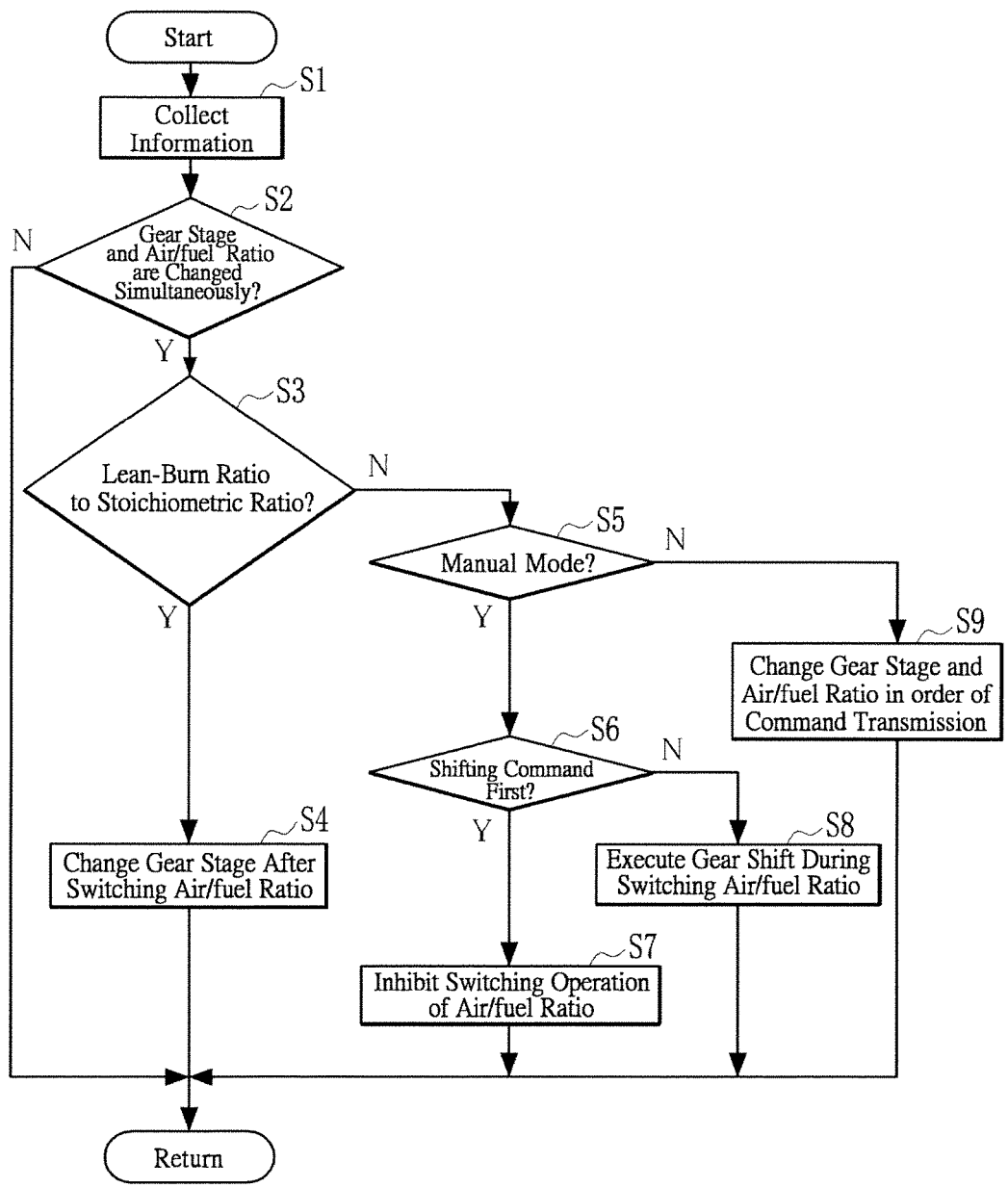
FIG. 9 is a flowchart showing a control example for avoiding simultaneous execution of the switching operation of the air/fuel ratio and the shifting operation of the gear stage.

Turning to FIG. 9, there is shown an example of a routine to alter the order of execution of the switching operation of the air/fuel ratio and the shifting operation of the gear stage. At step S1, the inhibitor 80 collects information from the above-mentioned sensors to observe an operating condition of the engine 11. Then, it is determined at step S2 whether or not both of the command signal for executing the switching operation of the air/fuel ratio and the command signal for executing the shifting operation of the gear stage has been transmitted. In other words, it is determined whether or not the shifting operation of the gear stage and the switching operation of the air/fuel ratio are expected to be executed simultaneously. If the answer of step S2 is NO, the routine is returned without carrying out any specific control. By contrast, if the answer of step S2 is YES, the routine progresses to step S3 to determine whether or not the air/fuel ratio is to be shifted from the lean-burn ratio to the stoichiometric ratio. If the answer of step S3 is YES, the routine progresses to step S4 to delay the shifting operation of the gear stage until the air/fuel ratio is switched completely to the stoichiometric ratio. That is, such delaying control of the shifting operation of the gear stage at step S4 is executed if the shift mode and the order of transmission of the command signals correspond to the above-explained patterns 5 to 8 in FIG. 6.

By contrast, if the answer of step S3 is NO, the air/fuel ratio is switched from the stoichiometric ratio to the lean-burn ratio. In this case, the routine progresses to step S5 to determine whether or not the command signal for executing the shifting operation was transmitted in response to a manual shifting operation by the driver. That is, it is determined whether or not the shift mode is in the manual mode. If the answer of step S5 is YES, the routine progresses to step S6 to determine whether or not the command signal for executing the shifting operation was transmitted before the command signal for executing the switching operation of the air/fuel ratio.

If the answer of step S6 is YES, the routine progresses to step S7 to inhibit the switching operation of the air/fuel ratio during execution of the manual shifting operation. That is, the switching operation of the air/fuel ratio from the stoichiometric ratio to the lean-burn ratio is delayed until completion of the manual shifting operation to the target gear stage as explained in the pattern 3 of FIG. 5.

By contrast, if the answer of step S6 is NO, the routine progresses to step S8 to allow execution of the shifting operation during switching the air/fuel ratio from the stoichiometric ratio to the lean-burn ratio. That is, the manual shifting operation is executed preferentially in line with the driver's intension even during the switching operation of the air/fuel ratio, as explained in the pattern 4 in FIG. 5.

If the answer of step S5 is NO, the routine progresses to step S9. In this case, the switching operation of the air/fuel ratio from the stoichiometric ratio to the lean-burn ratio and the shifting operation to the target gear stage are executed in the order of transmission of the command signals to prevent simultaneous execution of the switching operation of the air/fuel ratio and the shifting operation of the gear stage as explained in the patterns 1 and 2 in FIG. 5.

Figure 10:
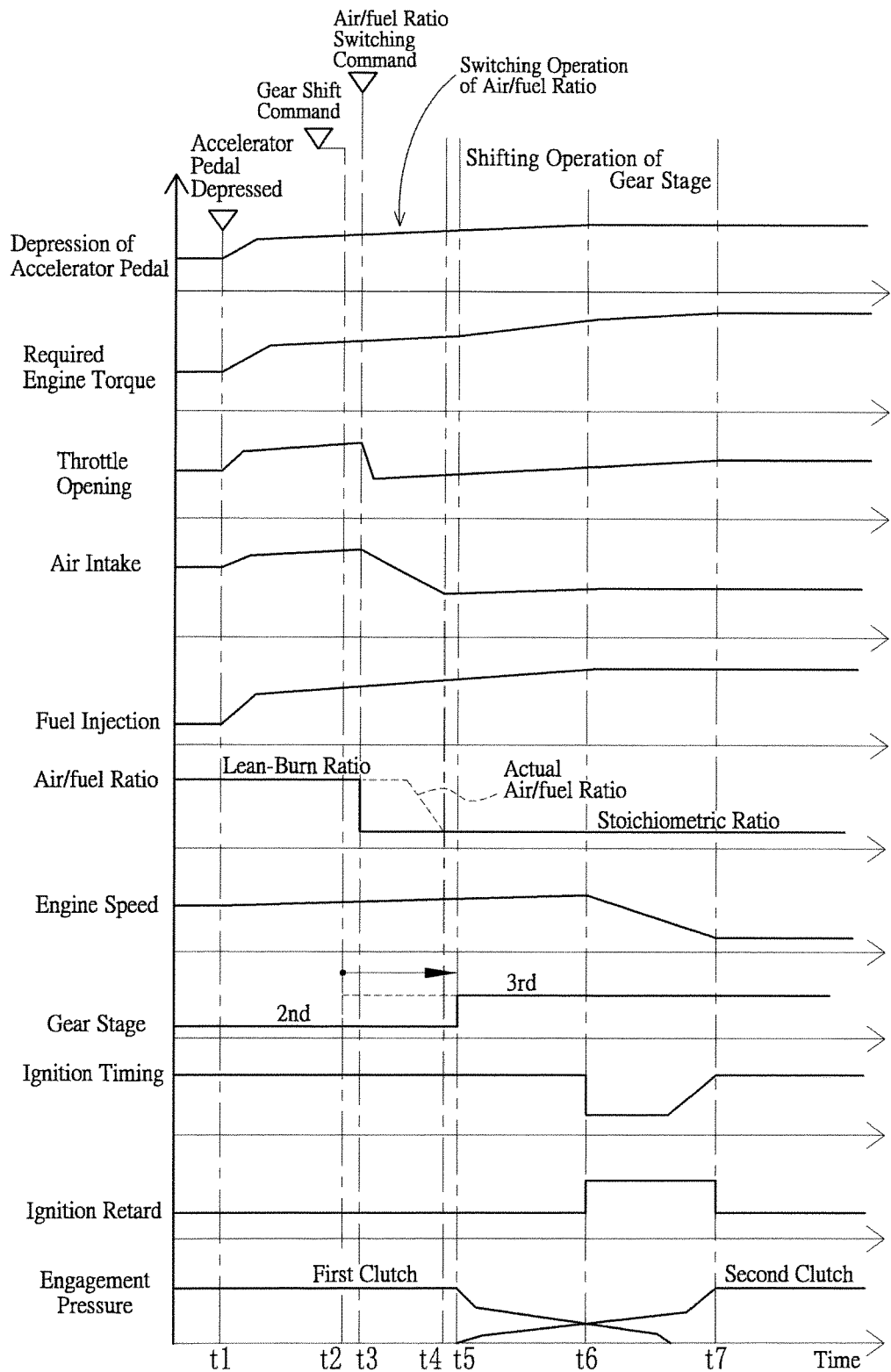
FIG. 10 is a time chart showing a situation of delaying the shifting operation of the gear stage after completion of the switching operation of the air/fuel ratio from the lean-burn ratio to the stoichiometric ratio.

Turning to FIG. 10, there is shown the order of executing the switching operation of the air/fuel ratio and the shifting operation of the gear stage on the occasion of power-on upshifting from the 2nd stage to the 3rd stage in the lean-burn mode (i.e., in the patterns 5 to 8 in FIG. 6). In the example shown in FIG. 10, the vehicle 10 runs on a flat road or an uphill road and the gear stage of the transmission 13 is set to the 2nd stage. In this situation, the operating point of the engine 11 falls within the lean-burn region as indicated by the first point 81 in FIG. 3 so that the air/fuel ratio is set to the lean-burn ratio. At point t1, the accelerator pedal is depressed so that the opening degree of the throttle valve 42 is increased by the throttle opening controller 78. Consequently, an air intake is increased and a fuel injection is increased by the fuel injection controller 79 so that the engine 11 is operated at a mid-speed.

At point t2, the target shift point of the transmission 13 is shifted in the shift map shown in FIG. 4 upwardly across the upshift line between the 2nd stage and the 3rd stage so that the command signal for executing the shifting operation is transmitted from the shift controller 74. In this situation, a required engine torque is increased in response to increase in the opening degree of the throttle valve 42 and the engine speed. Consequently, the operating point of the engine 11 is shifted to the second point 82 in the stoichiometric region as shown in FIG. 3 so that the command signal for switching the air/fuel ratio to the stoichiometric ratio is transmitted at point t3.

In this situation, the inhibitor 80 executes the switching operation of the air/fuel ratio to the stoichiometric ratio by reducing the air intake preferentially from the point 3 to point t4, and then start the shifting operation of the gear stage to the 3rd stage from point t5. That is, the shifting operation of the gear stage is delayed until completion of the switching operation of the air/fuel ratio. To this end, termination of the switching operation of the air/fuel ratio is detected by the air/fuel ratio sensor 45 based on the concentration of oxygen in the exhaust gas, and a length of a first waiting time between the point t4 and point t5 is determined based on a required time until combustion of the engine 11 is stabilized. Here, it is to be noted that the length of the first waiting time may also be zero.

Alternatively, a starting point of the shifting operation of the gear stage (i.e., at point t5 in FIG. 10) may also be determined based on a fact that a predetermined time has elapsed since the detection signal of the air/fuel ratio sensor 45 was stabilized.

As indicated by the dashed line in FIG. 10, an actual air/fuel ratio is changed slightly after the transition of the command for switching the air/fuel ratio at the point t3.

The gear stage of the transmission 13 is shifted from the 2nd stage to the 3rd stage by a clutch-to-clutch shifting. Specifically, disengagement of the first clutch and an engagement of the second clutch are started from point t5. Consequently, an inertia phase commences from point t6, and the ignition retard is executed from the point t6 by the ignition retard controller 75 so that the ignition timing of the engine 11 is retarded from the MBT timing at which the maximum cylinder pressure will occur. Such ignition retard is terminated at the point t7 when the inertia phase is terminated. Therefore, change in the input torque can be suppressed by the ignition retard during execution of the shifting operation, and the engine speed can be lowered smoothly from the mid-speed to the low speed.

Specifically, the commencement of the inertia phase is determined by the ECU 66 when a rotational speed of an input shaft of the transmission 13 starts changing from a synchronous speed in the 2nd stage. Here, although the ignition retard is executed during the inertia phase in the example shown in FIG. 10, a timing to carry out the ignition retard may be altered as long as the engine 11 is operated in the stoichiometric mode.

Here, such delaying control of the shifting operation shown in FIG. 10 may also be executed when the air/fuel ratio is shifted from the lean-burn ratio to the stoichiometric ratio as a result of shifting the gear stage from the 3rd stage to the 4th stage.

Figure 11:
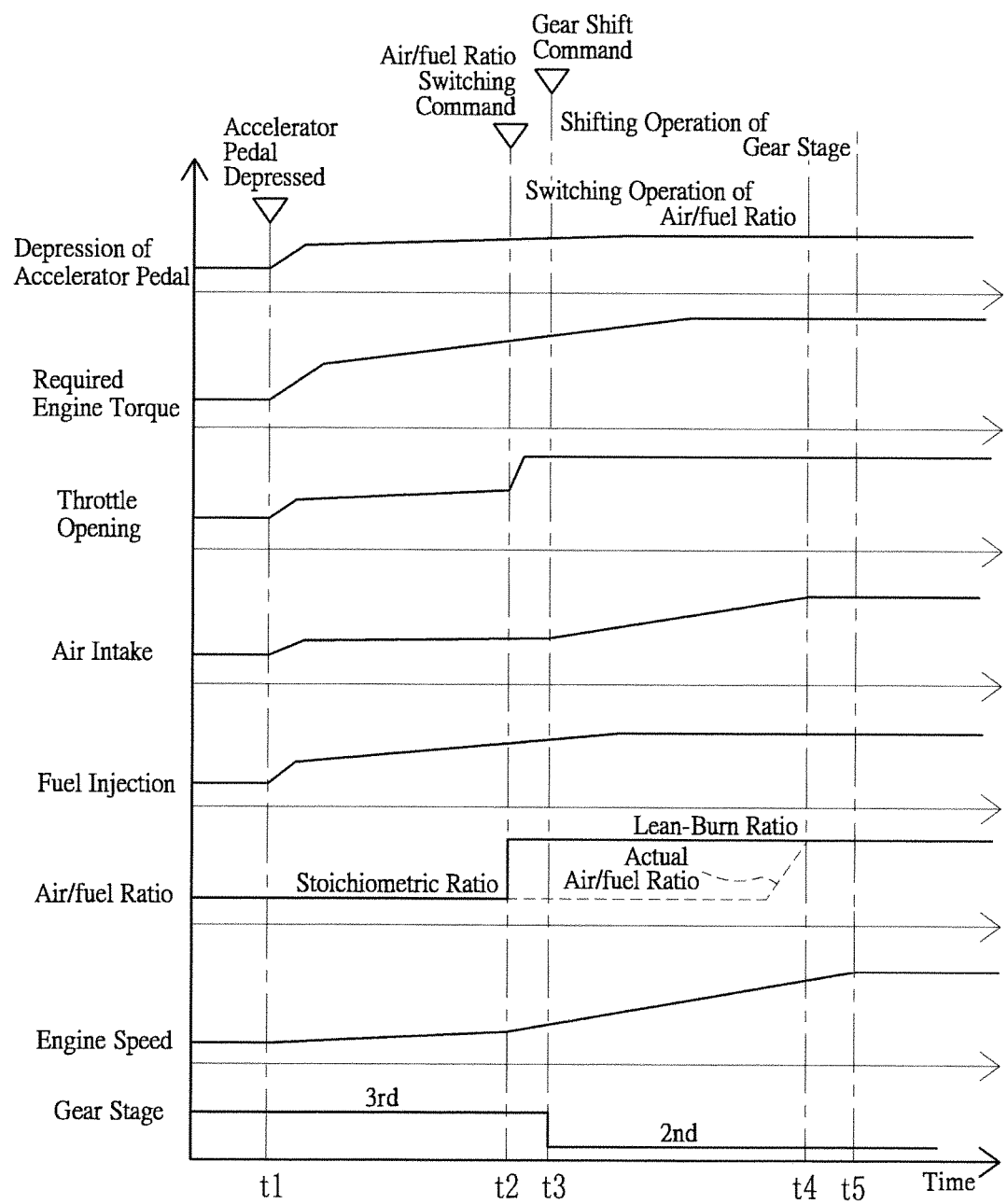
FIG. 11 is a time chart showing a situation of executing a manual shifting operation of the gear stage during execution of the switching operation of the air/fuel ratio from the stoichiometric ratio to the lean-burn ratio.

Turning to FIG. 11, there is shown the order of executing the switching operation of the air/fuel ratio and the shifting operation of the gear stage on the occasion of manually downshifting from the 3rd stage to the 2nd stage in the stoichiometric mode (i.e., in the pattern 4 in FIG. 5). In the example shown in FIG. 3, the vehicle 10 runs on a flat road or an uphill road and the gear stage of the transmission 13 is set to the 3rd stage. At point t1, the accelerator pedal is depressed so that the opening degree of the throttle valve 42 is increased by the throttle opening controller 78. Consequently, an air intake is increased and a fuel injection is increased by the fuel injection controller 79. In this situation, however, the engine speed is still maintained to the low speed.

As a result, the required engine torque is increased in response to increase in the opening degree of the throttle valve 42 and the engine speed, and hence the operating point of the engine 11 is shifted from the third operating point 83 in the stoichiometric region to the fourth operating point 84 in the lean-turbo region as shown in FIG. 3 so that the command signal for switching the air/fuel ratio to the lean-burn ratio is transmitted at point t2.

In the example shown in FIG. 11, therefore, the air/fuel ratio switching operation is commenced from the point t2, and the command signal for executing the shifting operation of the gear stage is transmitted at the point t3. In this case, the manual downshifting to the 2nd stage is executed upon reception of the command signal to comply with the driver's intension even during execution of the switching operation of the air/fuel ratio.

The switching operation of the air/fuel ratio to the lean-burn ratio is completed at the point t4, and the manual downshifting of to the 2nd stage is completed at the point t5. Consequently, the engine speed is increased to the mid-speed.

In this case, the actual air/fuel ratio starts changing significantly after the transmission of the command signal as indicated by the dashed line in FIG. 11. Therefore, the shifting operation of the gear stage can be executed before the air/fuel ratio is switched to the lean-burn ratio. For this reason, the engine misfire can be prevented even if the ignition retard is executed.

Here, the manual shifting operation may also be executed when shifting downwardly from the 2nd stage to the 1st stage, and shifting the gear stage upwardly, irrespective of depression of the accelerator pedal.

In addition, in order to suppress change in the input torque to the transmission 13 during execution of the shifting operation of the gear stage, it is preferable to switch the operating mode of the engine 11 to the lean-turbo mode or lean-burn mode after completion of the ignition retard and the manual shifting operation.

Figure 12:
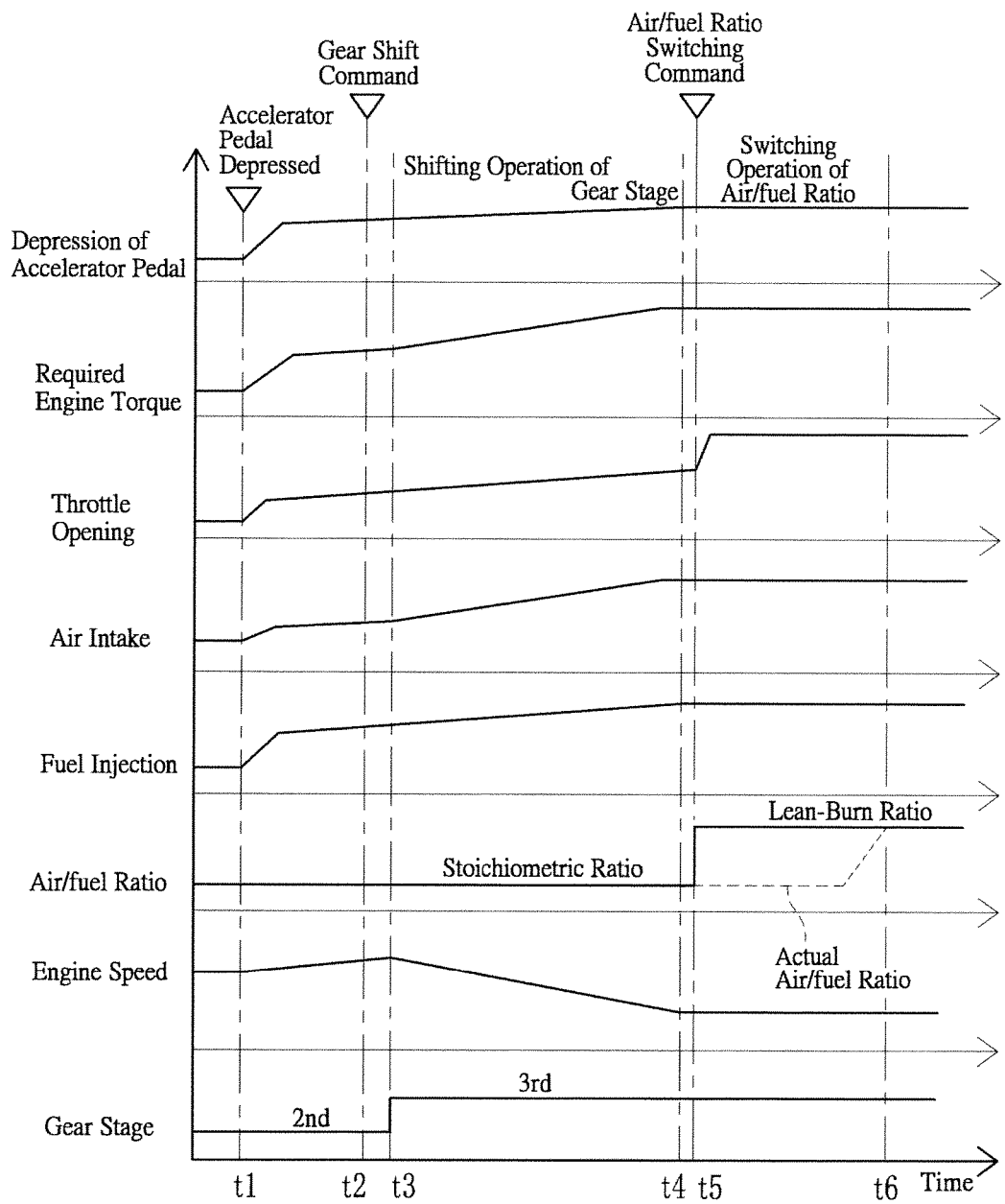
FIG. 12 is a time chart showing a situation of executing a manual shifting operation of the gear stage prior to executing the switching operation of the air/fuel ratio from the stoichiometric ratio to the lean-burn ratio.

Turning to FIG. 12, there is shown the order of executing the switching operation of the air/fuel ratio and the shifting operation of the gear stage on the occasion of upshifting manually from the 2nd stage to the 3rd stage in the stoichiometric mode (i.e., in the pattern 3 in FIG. 5). In the example shown in FIG. 3, the vehicle 10 runs on a downhill road or an uphill road, and the gear stage of the transmission 13 is set to the 2nd stage. At point t1, the accelerator pedal is depressed so that the opening degree of the throttle valve 42 is increased by the throttle opening controller 78. Consequently, an air intake is increased and a fuel injection is increased by the fuel injection controller 79. In this situation, the engine 11 is operated at high speed.

Then, the command signal for executing the manual upshifting is transmitted at the point t2 to commence the manual upshifting from the point t3.

In this situation, the required engine torque is increased in response to an increase in the opening degree of the throttle valve 42 and the engine speed, and hence the operating point of the engine 11 is shifted from the fifth operating point 85 in the stoichiometric region to the sixth operating point 86 in the lean-turbo region as shown in FIG. 3 so that the command signal for switching the air/fuel ratio to the lean-burn ratio is transmitted at point t3.

In this case, the switching operation of the air/fuel ratio is delayed after completion of the shifting operation of the gear stage. Specifically, the ECU 66 determines a fact that the input speed to the transmission 13 reaches the synchronous speed in the 3rd stage at the point t4. That is, the ECU 66 determines a termination of the shifting operation of the gear stage at the point t4, and then the switching operation of the air/fuel ratio is commenced after a lapse of a second waiting time between the point t4 and point t5. A length of the second waiting time may also be determined based on a required time until combustion of the engine 11 is stabilized, and the length of the second waiting time may also be zero.

In this case, the air/fuel ratio is thus maintained to the stoichiometric ratio in which the ignition timing is allowed to be retarded sufficiently thereby preventing an occurrence of engine misfire during execution of the manual shifting. In addition, since the air/fuel ratio is switched to the lean-burn ratio after completion of the manual shifting of the gear stage, change in the input torque to the transmission 13 can be suppressed. Further, the engine speed can be lowered smoothly.

Although the above exemplary embodiments of the present application have been described, it will be understood by those skilled in the art that the present application should not be limited to the described exemplary embodiments, and various changes and modifications can be made within the spirit and scope of the present application. For example, the vehicle control system may also be applied to a hybrid vehicle having an electric motor serving as a prime mover.

What is claimed is:

1. A vehicle control system that is applied to a vehicle having an engine that is operated by burning an air/fuel mixture supplied to cylinders, and a transmission that transmits a drive torque delivered from the engine while changing the drive torque by shifting a gear stage among a plurality of gear stages of different gear ratios, comprising:
   a controller for controlling the engine and the transmission that is configured to
   switch an operating mode of the engine between a stoichiometric mode in which an air/fuel ratio is set to a stoichiometric ratio, and a lean-burn mode in which the air/fuel ratio is set to a lean-burn ratio based on an operating point of the engine determined based on a speed and a torque of the engine,
   determine whether a shifting operation of the gear stage and a switching operation of the air/fuel ratio from the lean-burn ratio to the stoichiometric ratio are expected to be executed simultaneously, and
   in response to a determination that the shifting operation of the gear stage and the switching operation of the air/fuel ratio from the lean-burn ratio to the stoichiometric ratio are expected to be executed simultaneously, execute the shifting operation of the gear stage of the transmission after completion of a switching operation of the air/fuel ratio.

2. The vehicle control system as claimed in claim 1, wherein the controller is further configured to prevent a simultaneous execution of the switching operation of the air/fuel ratio and the shifting operation of the gear stage by executing the switching operation of the air/fuel ratio and the shifting operation of the gear stage in an order of transmission of command signals for executing those operations.

3. The vehicle control system as claimed in claim 1,
   wherein the gear stage of the transmission can be shifted manually, and
   wherein the controller is further configured to
   execute the shifting operation of the gear stage in response to a manual shifting operation executed by a driver during execution of the switching operation of the air/fuel ratio from the stoichiometric ratio to the lean-burn ratio, and
   delay the switching operation of the air/fuel ratio until completion of a manual shifting operation of the gear stage, if a condition to switch the air/fuel ratio from the stoichiometric ratio to the lean-burn ratio is satisfied during execution of the manual shifting operation of the gear stage.

\* \* \* \* \*